US012795200B2

(12) United States Patent
Parikh et al.

(10) Patent No.: US 12,795,200 B2
(45) Date of Patent: Nov. 10, 2026

(54) MACHINE-LEARNED MODEL-DRIVEN ANTI-PIRACY FRAMEWORK FOR CONTENT STREAMING SYSTEMS

(71) Applicant: Charter Communications Operating, LLC, St. Louis, MO (US)

(72) Inventors: Nikhil Parikh, Arvada, CO (US); Jason Donovan, Denver, CO (US); Byrn Baker, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 115 days.

(21) Appl. No.: 19/012,467

(22) Filed: Jan. 7, 2025

(65) Prior Publication Data

US 2026/0197523 A1 Jul. 9, 2026

(51) Int. Cl.
*H04N 21/442* (2011.01)

(52) U.S. Cl.
CPC .............................. *H04N 21/44236* (2013.01)

(58) Field of Classification Search
None
See application file for complete search history.

(56) References Cited

U.S. PATENT DOCUMENTS

2014/0032378 A1* 1/2014 Damnjanovic .... G06Q 30/0623 705/28
2019/0312887 A1* 10/2019 Grimm ................. H04L 63/145
2021/0377210 A1* 12/2021 Singh ...................... G06F 21/44
2026/0089180 A1* 3/2026 Avula ................. H04L 63/1425

* cited by examiner

*Primary Examiner* — Chris Parry
*Assistant Examiner* — Abderrahmen Chouat
(74) *Attorney, Agent, or Firm* — Dority & Manning, P.A.

(57) ABSTRACT

A content streaming system configured to autonomously monitor and proactively identify malicious actors (e.g., video-content pirates) is provided. In particular, the content streaming system is configured to receive a streaming request from a client device operating on a subnet. A machine-learned model of the content streaming system, which is configured to identify characteristics indicative of malicious actors that host pirated video content, processes the streaming request and transactional log(s) associated with the subnet. The content streaming system is configured to determine whether the subnet is a malicious subnet based on the streaming request and the transactional log(s). Responsive to determining that the subnet is a malicious subnet, the content streaming system is configured to disable video content transactions to the malicious subnet.

20 Claims, 4 Drawing Sheets

MACHINE-LEARNED MODEL-DRIVEN ANTI-PIRACY FRAMEWORK FOR CONTENT STREAMING SYSTEMS

BACKGROUND

A content streaming system may provide video content (e.g., live sporting events, movies, television shows, etc.) to client computing devices. Prior to providing the video content to a client computing device, the content streaming system may initiate an authentication process to determine whether the corresponding client computing device is authorized to receive, host, view, etc. the requested video content. In some examples, a client computing device (e.g., a malicious client computing device) may host pirated video content, which is video content the client computing device is otherwise unauthorized to receive, host, view, etc.

SUMMARY

The examples disclosed herein implement a machine-learned model-based mechanism and framework for autonomously monitoring content streaming systems and identifying malicious subnets requesting video content from content streaming systems.

In one implementation, a method is provided. The method includes receiving, by a content streaming system comprising one or more computing devices, a streaming request for video content from a client device operating on a subnet. The method further includes processing, by a machine-learned model of the content streaming system, the streaming request and a plurality of transactional logs associated with the subnet of the client device. The method further includes determining, by the content streaming system, that the subnet of the client device is a malicious subnet based on the streaming request and the plurality of transactional logs associated with the subnet of the client device, the malicious subnet being associated with hosting pirated video content. The method further includes, responsive to determining that the subnet of the client device is the malicious subnet, disabling, by the content streaming system, video content transactions to the malicious subnet.

In another implementation, a content streaming system is provided. The content streaming system includes a machine-learned model. The content streaming system further includes one or more computing devices. The one or more computing devices are operable to receive a streaming request for video content from a client device operating on a subnet. The one or more computing devices are further operable to process, by the machine-learned model, the streaming request and a plurality of transactional logs associated with the subnet of the client device. The one or more computing devices are further operable to determine that the subnet of the client device is a malicious subnet based on the streaming request and the plurality of transactional logs associated with the subnet of the client device, the malicious subnet being associated with hosting pirated video content. The one or more computing devices are further operable to, responsive to determining that the subnet of the client device is the malicious subnet, disable video content transactions to the malicious subnet.

In another implementation, a non-transitory computer-readable storage medium is provided. The non-transitory computer-readable storage medium includes executable instructions configured to cause a processor device of a content streaming system comprising a machine-learned model to receive a streaming request for video content from a client device operating on a subnet. The executable instructions are further configured to cause the processor device of the content streaming system to process, by the machine-learned model, the streaming request and a plurality of transactional logs associated with the subnet of the client device. The executable instructions are further configured to cause the processor device of the content streaming system to determine that the subnet of the client device is a malicious subnet based on the streaming request and the plurality of transactional logs associated with the subnet of the client device, the malicious subnet being associated with hosting pirated video content. The executable instructions are further configured to cause the processor device of the content streaming system to, responsive to determining that the subnet of the client device is the malicious subnet, disable video content transactions to the malicious subnet.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
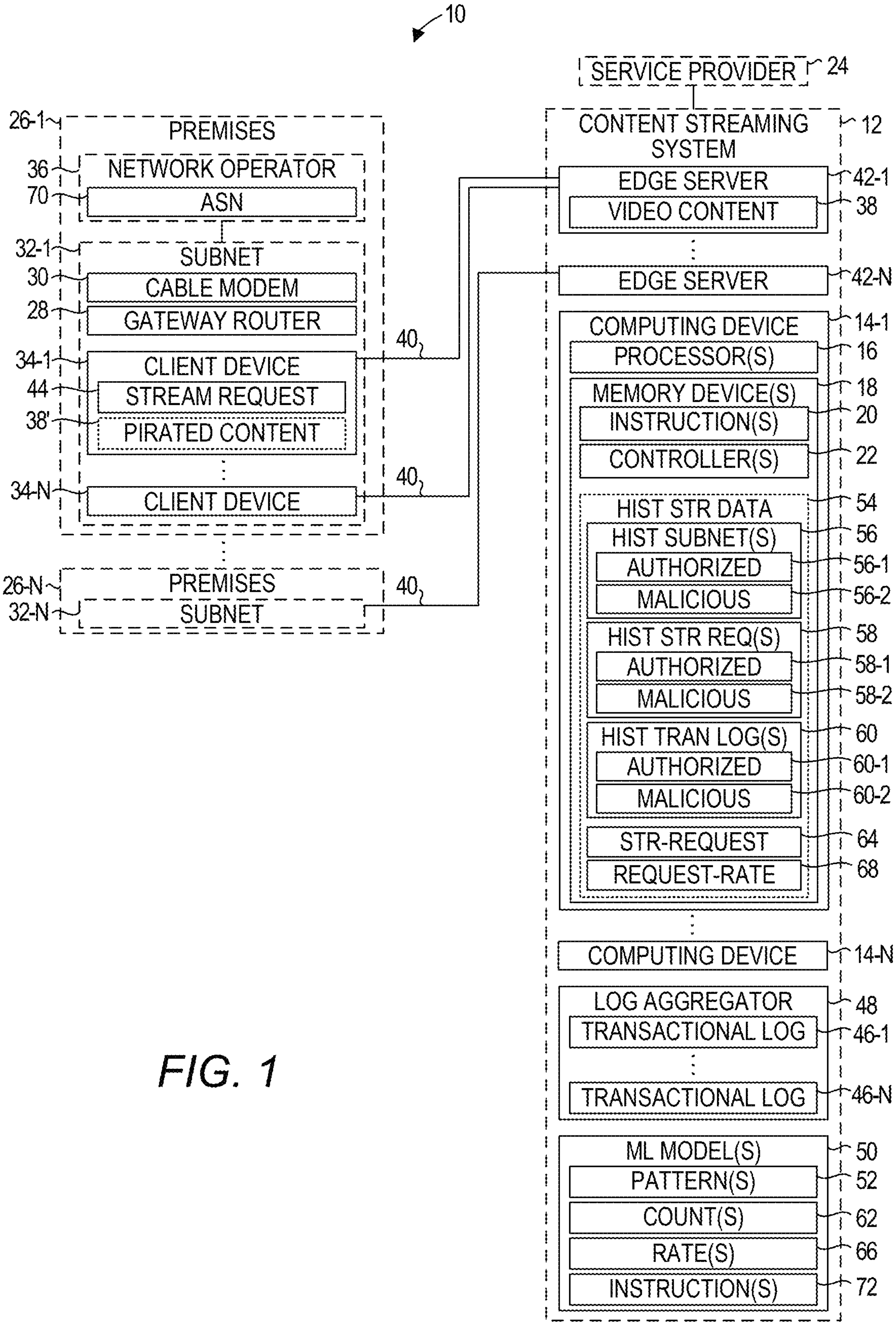
FIG. 1 is a block diagram suitable for implementing autonomous content streaming system monitoring and malicious subnet-detection operations according to some implementations.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples and claims are not limited to any particular sequence or order of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

A content streaming system may provide video content (e.g., live sporting events, movies, television shows, etc.) to client computing devices. Prior to providing the video content to a client computing device, the content streaming system may initiate an authentication process to determine whether the corresponding client computing device is authorized to receive, host, view, etc. the requested video content. In some examples, a client computing device (e.g., a malicious client computing device) may host pirated video content, which is video content the client computing device is otherwise unauthorized to receive, host, view, etc.

Video content piracy poses a significant threat to content streaming systems, such as content distribution networks (CDNs) and/or the like, in video-content streaming scenarios. Pirates employ increasingly advanced techniques and tactics, including distributed attacks, to illegally access video content from the content streaming system that is intended for authorized users. As used herein, "video content piracy" and/or "video piracy" refers to the unauthorized access, hosting, distribution, etc. of video content by a computing device. Furthermore, a "malicious" entity and/or a "pirate" refers to a user, network operator, service provider, etc. that employs video-content piracy tactics to illegally access, host, distribute, etc. pirated video content.

Typically, content streaming systems rely on traditional geo-fencing techniques to identify potential malicious actors based solely on internet protocol-related (IP-related) geolocation data. However, such traditional geo-fencing techniques are becoming obsolete, due in large part to the increasing number of malicious actors operating within permitted regions, such as within the United States. As such, current content streaming systems lack effective mechanisms and frameworks to adequately distinguish between legitimate (e.g., authorized) entities and pirates (e.g., unauthorized/malicious entities). Hence, these existing limitations allow pirates using US-based IP subnets to evade detection and access and/or host pirated video content.

To address the aforementioned limitations of some content streaming systems, example aspects of the present disclosure are directed to methods and related systems that integrate and leverage machine-learned models to monitor and identify malicious actors attempting to access protected video content. In particular, a content streaming system of the present disclosure may leverage a sophisticated learning algorithm that is configured to analyze streaming patterns and incorporate inputs from operators to distinguish between legitimate (authorized) users and malicious (unauthorized) users. As described in greater detail below, the machine-learned model may be configured to identify streaming-related anomalies associated with subnets, client devices, and/or any combination thereof. By way of non-limiting example, the machine-learned model may be configured to identify anomalies in streaming patterns, access frequencies, device fingerprinting, and/or the like. In this way, a content streaming system of the present disclosure may autonomously and instantaneously block malicious users, thereby preventing video content theft without requiring manual (e.g., user) intervention.

As a general, non-limiting overview, an example content streaming system of the present disclosure may receive a streaming request from a client device operating on a subnet. As used herein, a "subnet" or "subnetwork" refer to a data communications network, often but not necessarily an Ethernet network, wherein each connected client device on the subnet has an internet protocol (IP) address that has the same network address, and which utilizes the same subnet mask (not shown) to determine whether other client devices are on the same network or on a different network. Such client devices may be referred to herein as being "on," "connected to," "coupled to," or "operating on" the same subnet. Computing devices on the same subnet may communicate with one another via layer 2 addressing (e.g., media access control (MAC) address) without the need for a router (e.g., gateway router). Local area networks (LANs), wireless LANs, and/or the like are non-limiting examples of a subnet.

Upon receiving the streaming request from the client device, a machine-learned model of the content streaming system may process the streaming request and a plurality of transactional logs associated with the corresponding subnet on which the client device is operating. As discussed in greater detail below, the plurality of transactional logs may be stored in a log aggregator (and/or any suitable memory device) of the content streaming system, and each transactional log may correspond to a video content transaction between a client device and the content streaming system.

Based on the streaming request and the plurality of transactional logs (e.g., real-time transactional logs and/or historical transactional logs), the content streaming system may determine whether the subnet on which the client device is operating is an authorized subnet or a malicious subnet. More particularly, as described herein, the machine-learned model of the content streaming system may be configured to identify characteristics that are indicative of malicious subnets and/or malicious client devices such as, by way of non-limiting example, unusual numbers of streaming requests originating from one "household" (e.g., internet protocol (IP) address), streaming requests originating from non-domestic (e.g., foreign) subnets, streaming request originating from malicious domestic subnets, brute force attacks (e.g., alphanumeric-based Uniform Resource Locator (URL) attacks), streaming requests from subnets having excessive socket connections to the content streaming system, unusual Hypertext Transfer Protocol (HTTP) requests (e.g., HTTP POST requests), and/or the like.

As a general, non-limiting illustrative example, an example machine-learned model of the present disclosure may be configured to continuously monitor the number of active streams (e.g., socket connections) originating from individual subnets (e.g., individual premises, households, etc.). If a subnet attempts to exceed a reasonable threshold of active streams, the content streaming system may identify the corresponding subnet as a potential malicious subnet. In some examples, the threshold may be a standardized, across-the-board threshold for each subnet serviced by the content streaming system. In other examples, the threshold may be specific to the particular subnet, account, etc. Similarly, the machine-learned model may also be configured to continuously monitor the number of streaming requests originating from individual users (e.g., individual client devices). If a user (e.g., client device) provides more streaming requests than a typical user (e.g., client device) over a particular period of time (e.g., indicative of a distributed denial-of-service (DDoS) attack), the content streaming system may identify the corresponding user (e.g., client device) as a malicious user (e.g., malicious client device).

As another general, non-limiting illustrative example, an example machine-learned model of the present disclosure may be configured to identify an organization (e.g., network operator, service provider, etc.) associated with individual subnets and, based on the particular organization, determine whether the corresponding subnet is a malicious subnet. For instance, in some examples, the content streaming system may store a plurality of autonomous system numbers (ASNs) respectively associated with a plurality of organizations (e.g., network operators, service providers, etc.). The machine-learned model may obtain the ASN associated with the subnet from which the streaming request originated and may determine, based on the plurality of stored ASNs, that the particular organization is associated with hosting pirated content. As one example, foreign network operators may be identified as malicious network operators. As another example, some domestic cloud service providers are associated with hosting pirated video content and, as such, may be identified as malicious network operators.

The subsequent actions taken by the content streaming system (e.g., following the identification of the subnet on which the client device is operating) may differ depending on whether the subnet is an authorized subnet or a malicious subnet. For instance, responsive to determining that the subnet on which the client device is operating is an authorized subnet, the content streaming system may provide the video content to the corresponding client device.

Conversely, responsive to determining that the subnet on which the client device is operating is a malicious subnet, the content streaming system may disable video content transactions to the malicious subnet. More particularly, once identified, the machine-learned model may generate blocking instructions. The machine-learned model may also automatically trigger an Application Programming Interface (API) call (e.g., API request) that instructs (e.g., via blocking instructions) a network controller of the content streaming system to block the malicious entity (e.g., malicious client device, malicious subnet, etc.) at the IP/network layer (e.g., layer 3) and terminate the socket connection(s) between the malicious entity and the content streaming system. In this way, the content streaming system may proactively ensure malicious entities are unable to exhaust content streaming system resources by opening excessive sockets.

The present disclosure provides a number of technical effects and benefits, including improvements to computing technology. As one example, the present disclosure improves network-security frameworks for content streaming systems by providing robust protection against unauthorized content access by unauthorized and/or malicious actors, thereby safeguarding sensitive network data, such as intellectual property, premium video content, revenue streams, and/or the like. Moreover, aspects of the present disclosure provide scalable and adaptable frameworks for monitoring content streaming systems having any suitable size and/or function, such as content streaming systems that facilitate small-scale events to content streaming systems that facilitate large-scale broadcasts, thereby providing for dynamic and efficient system-level monitoring and protection. By integrating a machine-learned model into the content streaming system, aspects of the present disclosure reduce real-world costs associated with piracy monitoring and/or piracy mitigation, thereby enhancing and improving the overall performance of the content streaming system and reducing and/or eliminating manual actions that would otherwise be necessary. Even further, by blocking identified malicious actors at the IP/network level (e.g., layer 3), content streaming systems are less susceptible to network attacks (e.g., DDoS attacks, brute force attacks, etc.) that would otherwise exhaust the content streaming system's resources. As such, aspects of the present disclosure proactively fortify content streaming system defenses against the increasing threat of video piracy, while simultaneously providing a seamless and reliable streaming experience for authorized users.

Aspects of the present disclosure may also provide resulting improvements to computing technology tasked with monitoring content streaming systems and identifying malicious entities (e.g., video-content pirates). Improvements in the speed, accuracy, and efficiency network monitoring and malicious-entity identification may directly improve operational speeds for computing systems, such as the content streaming system and/or the like. For instance, the machine-learned models of the present disclosure may be trained on—and identify malicious entities based on—data that is stored on the content streaming system, thereby reducing processing and storage requirements for the content streaming system. Hence, the reduced processing and storage requirements may ultimately result in more-efficient resource use for the content streaming system. In this way, valuable computing resources within the content streaming system that would have otherwise been needed for such tasks may be reserved for other tasks.

FIG. 1 is a block diagram of an environment 10 suitable for implementing autonomous content streaming system monitoring and malicious subnet-detection operations according to some implementations. The environment 10 includes a content streaming system 12. The content streaming system 12 may be any suitable system operable to store, deliver, distribute, etc. video content, such as a Content Delivery Network (CDN) and/or the like.

The content streaming system 12 includes one or more computing devices 14 that, together, form a service provider computing system/network. It should be understood that example aspects of the present disclosure are disclosed and/or depicted as being implemented by a single component on a single computing device of the content streaming system 12 for purposes of illustration and discussion. However, in some examples, the functionality described herein may be distributed across multiple components on multiple computing devices of the content streaming system 12. Moreover, while solely for purposes of illustration, various components will be illustrated as executing on the computing device(s) 14, it is noted that the components could execute in different operating environments including, by way of non-limiting example, virtual machine environment(s), cloud computing environment(s), and/or the like.

The computing device 14 may include a processor device 16. The processor device 16 may include any computing or electronic device(s) capable of executing software instructions to implement the functionality described herein. For example, the processor device 16 may be one or more of a processor, processor cores, a controller and an arithmetic logic unit, a central processing unit (CPU), a graphics processing unit (GPU), a digital signal processor (DSP), an image processor, a microcomputer, a field programmable array, a programmable logic unit, an application-specific integrated circuit (ASIC), a microprocessor, a microcontroller, etc., and combinations thereof, including any other device capable of responding to and executing instructions in a defined manner. The processor device 16 may be a single processor device and/or a plurality of processor devices that are operatively connected, for instance, in a parallel configuration.

The computing device 14 may further include a memory 18. The memory 18 may be communicatively coupled to the processor device 16. The memory 18 may include executable instructions 20 that, when executed, cause the processor device 16 to perform operations, such as any of the operations described herein. In some examples, the memory 18 includes a controller 22 operable to implement the functionality described herein. Because the controller 22 is a component of the content streaming system 12 and/or the computing device 14, functionality implemented by the controller 22 may be attributed to the content streaming system 12 and/or the computing device 14 generally. Moreover, in examples where the controller 22 includes software instructions (e.g., instructions 20) that program the processor device 16 to carry out the functionality described herein, functionality implemented by the controller 22 may be attributed to the processor device 16, the content streaming system 12, and/or to the computing device 14 generally.

The memory 18 may be or otherwise include any device(s) capable of storing data, including, but not limited to, volatile memory (random access memory, etc.), non-volatile memory, storage device(s) (e.g., hard drive(s), solid state drive(s), etc.). For example, the memory device 18 may include one or more non-transitory computer-readable storage mediums, such as such as a Read Only Memory (ROM), Programmable Read Only Memory (PROM), Erasable Programmable Read Only Memory (EPROM), and flash memory, a USB drive, a volatile memory device such as a Random Access Memory (RAM), an internal or external hard disk drive (HDD), floppy disks, a blue-ray disk, or optical media such as CD ROM discs and DVDs, and combinations thereof. However, examples of the memory device 18 are not limited to the above description, and the memory device 18 may be realized by other various devices and structures as would be understood by those having ordinary skill in the art.

The content streaming system 12 may be operated by a service provider 24 (e.g., network operator). The service provider 24 may provide service(s) to a plurality of premises 26-1-26-N (generally, premise(s) 26). In some examples, the service provider 24 may provide service(s) to thousands, tens of thousands, or millions of different premises 26.

More particularly, each premises 26 may include one or more customer premises equipment (CPE), such as a gateway router 28 and a cable modem 30. The gateway router 28 implements a subnet 32 in the premises 26 and communicates with other networks via the cable modem 30. The subnet 32 may be any suitable subnetwork, such as, by way of non-limiting example, an Ethernet network, a local-area network (LAN), a wireless LAN, and/or the like.

The gateway router 28 may implement traditional gateway router services, such as dynamic host configuration protocol (DHCP) services for providing network-connected computing devices with internet protocol (IP) addresses as needed, network address translation (NAT) services to translate private IP addresses associated with a subnetwork (e.g., subnet 32) to a public IP address, Domain Name System (DNS) services for translating a domain name to an IP address, and/or the like.

As used herein, a "subnet" or "subnetwork" refer to a data communications network, often but not necessarily an Ethernet network, wherein each connected client device on the subnet has an internet protocol (IP) address that has the same network address, and which utilizes the same subnet mask (not shown) to determine whether other client devices are on the same network or on a different network. Such client devices may be referred to herein as being "on," "connected to," "coupled to," or "operating on" the same subnet. Computing devices on the same subnet may communicate with one another via layer 2 addressing (e.g., media access control (MAC) address) without the need for a router (e.g., gateway router 28). For instance, in the example depicted in FIG. 1, client devices 34-1-34-N (generally, client device(s) 34) are operating on the subnet 32-1.

More particularly, a client device 34 operating on the subnet 32 may communicate with another client device 34, which is also operating on the subnet 32, via layer 2 communication protocol and may communicate with another device connected to other networks, such as a network (e.g., content streaming system 12) of the service provider 24 that provides services to an entity operating the subnet 32 (e.g., network operator 36), via layer 3 communication protocols, such as a computing device of the content streaming system 12.

As an illustrative example, the client device 34 may be communicatively coupled to—and may be configured to receive video content 38 from—the content streaming system 12. The video content 38 may be any suitable video content, such as, by way of non-limiting example, live sporting event(s), movie(s), television show(s), and/or the like. More particularly, the client device 34 may establish a connection 40 (e.g., socket connection) to an edge server 42-1-42-N (generally, edge server(s) 42) of the content streaming system 12. It should be understood that the edge server 42 may be any suitable computing device and/or server without deviating from the scope of the present disclosure. The client device 34 may initiate a video content transaction with the content streaming system 12 via a streaming request 44. For each streaming request 44 provided by the client device 34 (e.g., for each video content transaction), the content streaming system 12 generates a corresponding transactional log 46, which is stored in a log aggregator 48 of the content streaming system 12. As will be discussed in greater detail below, the content streaming system 12 may be configured to generate and/or store both real-time transactional logs (e.g., transactional log(s) 46), historical transactional logs (e.g., historical transactional log(s) 60), and/or any combination thereof.

Typically, upon receiving the streaming request 44, the content streaming system 12 may authenticate the entity (e.g., network operator 36) operating the subnet 32 to determine whether the client device 34 is authorized to receive, host, etc. the video content 38. If the client device 34 is authenticated, the content streaming system 12 may provide the video content 38 to the client device 34 via the connection 40.

It should be understood that, as used herein, an "authorized" client device refers to a client device that is authorized to receive, host, etc. the video content 38. Conversely, as used herein, a "unauthorized" client device refers to a client device that is not authorized to receive, host, etc. the video content 38.

The examples disclosed herein implement machine-learned model-based mechanisms and frameworks for autonomously monitoring the content streaming system 12 for "malicious" client devices. It should be understood that, as used herein, a "malicious" client device refers to an unauthorized client device 34 that receives, hosts, distributes, etc. pirated video content 38'. Furthermore, a "malicious" subnet refers to a subnet 32 on which "malicious" client devices operate.

More particularly, the content streaming system 12 may include one or more machine-learned models 50 (generally, machine-learned model 50). It should be understood that, although only one machine-learned model 50 is depicted in FIG. 1, the content streaming system 12 may include multiple machine-learned models 50 and/or may be configured to leverage distributed computing architecture(s) to train, generate, implement, etc. multiple models in parallel, thereby reducing the time, computing and/or processing resources, memory, etc. associated with performing the operations described herein.

As described herein, the machine-learned model 50 may be and/or may include any suitable model, algorithm, etc. to implement the malicious subnet-detection operations described herein for the content streaming system 12. It should be understood that the machine-learning model 50 may be any suitable machine-learning model, such as a neural network (e.g., deep neural network, feed-forward neural network, recurrent neural network, convolutional neural network, etc.) and/or other types of machine-learning models (e.g., non-linear models, linear models, etc.). In some examples, the machine-learning model 50 may be trained using an unsupervised training algorithm (e.g., K-means, hierarchical clustering, etc.) to refine the machine-learning model 50 and its corresponding outputs.

With this background, example aspects of the present disclosure are directed to systems, methods, frameworks, etc. for identifying malicious client device(s) operating on malicious subnet(s) and preventing video content by the malicious client device(s) (and malicious subnet(s)). That is, the content streaming system 12 may be configured to execute sophisticated machine-learned models and algorithms (e.g., machine-learned model 50) to autonomously and instantaneously block video content transactions between the content streaming system 12 and malicious client device(s) and/or malicious subnet(s).

As a general overview, the content streaming system 12 may receive a streaming request 44 from a client device 34-1 operating on the subnet 32-1. The machine-learned model 50 may process the streaming request 44 and a plurality of transactional logs 46 associated with the subnet 32-1 of the client device 34-1. The content streaming system 12 (e.g., via the machine-learned model 50) may determine that the subnet 32-1 is a malicious subnet 32-1 based on the streaming request 44 and the plurality of transactional logs 46 processed by the machine-learned model 50 and, in response, may disable video content transactions to the malicious subnet 32-1 (e.g., from the content streaming system 12).

The malicious subnet-detection operations of the present disclosure are discussed in greater detail below.

As noted above, the content streaming system 12 may include the machine-learned model 50. The machine-learned model 50 may be configured to identify streaming-pattern characteristics 52 that are indicative of malicious subnets, such as, by way of non-limiting example, unusual numbers of streaming requests originating from one "household" (e.g., internet protocol (IP) address), streaming requests originating from non-domestic (e.g., foreign) subnets, streaming request originating from malicious domestic subnets, brute force attacks (e.g., alphanumeric-based Uniform Resource Locator (URL) attacks), streaming requests from subnets having excessive socket connections to the content streaming system, unusual Hypertext Transfer Protocol (HTTP) requests (e.g., HTTP POST requests), and/or the like.

In particular, the machine-learned model 50 may be trained using historical streaming data 54 (e.g., as training data) to identify the streaming-pattern characteristics 52, which identify and/or are otherwise associated with behavior(s) taken by malicious subnets. The historical streaming data 54 may include any suitable data associated with video content transactions to computing devices. By way of non-limiting example, the historical streaming data 54 may include historical subnet data 56, such as data 56-1 identifying one or more authorized subnets, data 56-2 identifying one or more malicious subnets, and/or the like. The historical streaming data 54 may further include historical streaming requests 58, such as data 58-1 associated with streaming requests received from one or more authorized client devices, data 58-2 associated with streaming requests received from one or more malicious client devices, and/or the like. The historical streaming data 54 may further include historical transactional logs 60, such as transactional logs 60-1 associated with one or more authorized subnets, transactional logs 60-2 associated with one or more malicious subnets, and/or the like. Although not depicted in FIG. 1, in some examples, the historical transactional logs 60 may be stored in the log aggregator 48. It should be understood that the historical streaming data 54 may include any suitable data associated with video content transactions without deviating from the scope of the present disclosure.

The content streaming system 12 may receive the streaming request 44 from the client device 34-1 and may process the streaming request 44, and a plurality of transactional logs 46 associated with the subnet 32-1 of the client device 34-1, via the machine-learned model 50.

In some examples, to determine whether the subnet 32-1 of the client device 34-1 is a malicious subnet, the machine-learned model 50 may determine a streaming-request count 62 for the subnet 32-1 (e.g., based on the plurality of transactional logs 46 associated with the subnet 32-1) and may compare the streaming-request count 62 to a streaming-request threshold 64. The streaming-request count 62 may correspond to a number of streaming requests (e.g., streaming request 44) received by the content streaming system 12 that originate from the subnet 32-1 of the client device 34-1. In some examples, the streaming-request threshold 64 may be a standardized number of streaming requests 44, such as a minimum and/or typical number of streaming requests 44 associated with malicious subnets as determined by the machine-learned model 50 based on the historical streaming data 54. In some examples, the streaming-request threshold 64 may be specific to the client device 34-1, such as a number of authorized users associated with the subnet 32-1.

In some examples, the machine-learned model 50 may determine that the streaming-request count 62 for the subnet 32-1 is less than the streaming-request threshold 64. In such examples, in response to determining that the streaming-request count 62 is less than the streaming-request threshold 64, the computing system 12 may determine that the subnet 32-1 is an authorized subnet.

In other examples, the machine-learned model 50 may determine that the streaming-request count 62 for the subnet 32-1 exceeds (or is equal to) the streaming-request threshold 64. In such examples, in response to determining that the streaming-request count 62 exceeds (or is equal to) the streaming-request threshold 64, the computing system 12 may determine that the subnet 32-1 is the malicious subnet 32-1.

Additionally and/or alternatively, in some examples, to determine whether the subnet 32-1 of the client device 34-1 is a malicious subnet, the machine-learned model 50 may determine a streaming-request rate 66 for the subnet 32-1 (e.g., based on the plurality of transactional logs 46 associated with the subnet 32-1) and may compare the streaming-request rate 66 to a request-rate threshold 68. The streaming-request rate 66 may correspond to a frequency of streaming requests (e.g., streaming request 44) received by the content streaming system 12 that originate from the subnet 32-1 of the client device 34-1. In some examples, the request-rate threshold 68 may be a standardized number of streaming requests 44, such as a minimum and/or typical rate of streaming requests 44 received from malicious subnets as determined by the machine-learned model 50 based on the historical streaming data 54. In some examples, the request-rate threshold 68 may be specific to the client device 34-1, such as a number of streaming requests for each authorized users associated with the subnet 32-1 over a period of time.

In some examples, the machine-learned model 50 may determine that the streaming-request rate 66 for the subnet 32-1 is less than the request-rate threshold 68. In such examples, in response to determining that the streaming-request rate 66 is less than the request-rate threshold 68, the computing system 12 may determine that the subnet 32-1 is an authorized subnet.

In other examples, the machine-learned model 50 may determine that the streaming-request rate 66 for the subnet 32-1 exceeds (or is equal to) the request-rate threshold 68. In such examples, in response to determining that the streaming-request rate 66 exceeds (or is equal to) the request-rate threshold 68, the computing system 12 may determine that the subnet 32-1 is the malicious subnet 32-1.

Additionally and/or alternatively, in some examples, to determine whether the subnet 32-1 of the client device 34-1 is a malicious subnet, the machine-learned model 50 may identify the network operator 36 of the subnet 32-1 of the client device 34-1 based on the streaming request 44. In some examples, the machine-learned model 50 may determine that the network operator 36 of the subnet 32-1 is associated with hosting pirated video content 38' (e.g., based on historical streaming data 54). In such examples, in response to determining that the network operator 36 of the subnet 32-1 is associated with hosting the pirated video content 38', the computing system 12 may determine that the subnet 32-1 is the malicious subnet 32-1.

By way of non-limiting example, the machine-learned model 50 may determine that the service provider (e.g., network operator 36) of the subnet 32-1 is different from the service provider 24 of the content streaming system 12. In such examples, the content streaming system 12 may determine that the subnet 32-1 is the malicious subnet 32-1.

By way of another non-limiting example, the machine-learned model 50 may determine that the service provider (e.g., network operator 36) of the subnet 32-1 is a cloud service provider. In such examples, the content streaming system 12 may determine that the subnet 32-1 is the malicious subnet 32-1.

By way of another non-limiting example, the machine-learned model 50 may obtain an autonomous system number (ASN) 70 associated with the network operator 36 of the subnet 32-1. In such examples, the machine-learned model 50 may determine whether the ASN 70 associated with the network operator 36 of the subnet 32-1 is associated with hosting the pirated video content 38' based on the historical streaming data 54. For instance, in some examples, the historical subnet data 56 may include a plurality of ASNs respectively associated with authorized subnets (e.g., data 56-1) and malicious subnets (e.g., data 56-2).

By way of another non-limiting example, the content streaming system 12 may receive a Hypertext Transfer Protocol (HTTP) POST request from the client device 34-1. In such examples, in response to receiving the HTTP POST request from the client device 34-1, the machine-learned model 50 may determine that the subnet 32-1 of the client device 34-1 is the malicious subnet 32-1.

Responsive to determining that the subnet 32-1 of the client device 34-1 is the malicious subnet 32-1, the content streaming system 12 may disable video content transactions to the malicious subnet 32-1. That is, in response to determining that the subnet 32-1 of the client device 34-1 is the malicious subnet 32-1, the content streaming system 12 may terminate the socket connection 40 between the client device 34-1 and the content streaming system 12. In some examples, the client device 34-1 may be one of a plurality of malicious client devices 34 operating on the malicious subnet 32-1. In such examples, responsive to determining that the subnet 32-1 is the malicious subnet 32-1, the content streaming system 12 may terminate each respective socket connection 40 between the plurality of malicious client devices 34 and the content streaming system 12.

For instance, in some examples, in response to determining that the subnet 32-1 of the client device 34-1 is the malicious subnet 32-1, the machine-learned model 50 may configure a network controller (e.g., controller 22) to block layer 3 communications between the malicious subnet 32-1 and the content streaming system 12. That is, in response to determining that the subnet 32-1 of the client device 34-1 is the malicious subnet 32-1, the machine-learned model 50 may automatically trigger an API call and provide blocking instructions 72 to the network controller (e.g., controller 22). In such examples, the network controller (e.g., controller 22) may disable the layer 3 communications between the malicious subnet 32-1 and the content streaming system 12 based on the blocking instructions 72.

Figure 2:
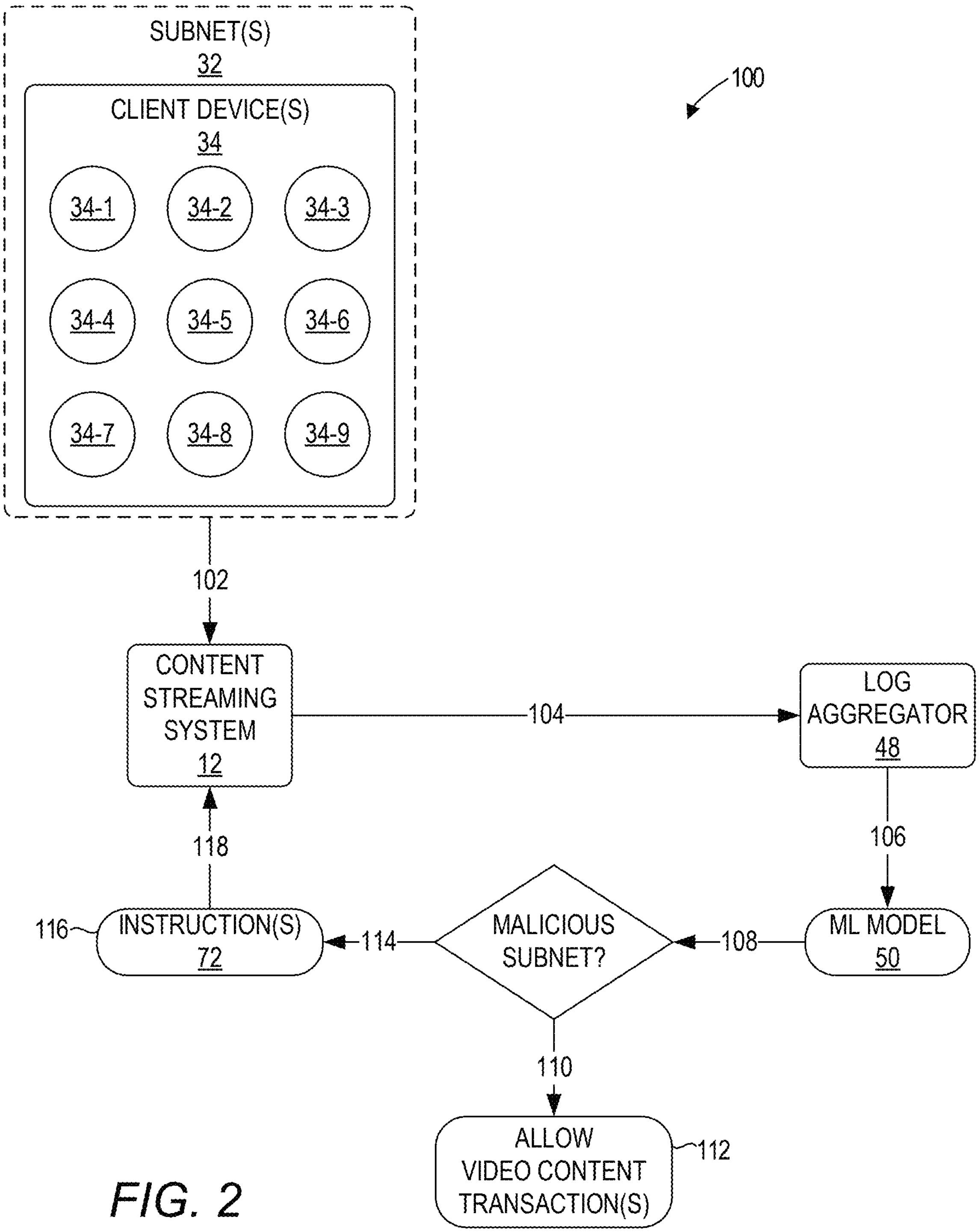
FIG. 2 is a process flow diagram of an example framework suitable for implementing autonomous content streaming system monitoring and malicious subnet-detection operations according to some implementations.

FIG. 2 depicts a process flow diagram of an example framework 100 suitable for implementing autonomous content streaming system monitoring and malicious subnet-detection operations according to some implementations. FIG. 2 will be discussed in conjunction FIG. 1. The content streaming system 12 receives a plurality of streaming requests 44 from a plurality of client devices 34 operating on a subnet 32-1 (FIG. 2, step 102). For each respective streaming request 44, the content streaming system 12 stores a corresponding transactional log 46 in a log aggregator 48 (FIG. 2, step 104). For each respective streaming request 44, the log aggregator 48 provides the plurality of transactional logs 46 associated with the subnet 32-1 and the corresponding streaming request 44 to the machine-learned model 50 (FIG. 2, step 106).

The machine-learned model 50 processes the plurality of transactional logs 46 associated with the subnet 32-1 and each streaming request 44 (FIG. 2, step 108) and determines whether the subnet 32-1 is an authorized subnet or a malicious subnet associated with hosting pirated video content 38' (FIG. 2, step 110). The content streaming system 12 may determine whether the subnet 32-1 is the authorized subnet or the malicious subnet in any suitable manner, such as any of the examples discussed above with reference to FIG. 1 and/or any combination thereof.

In some examples, the machine-learned model 50 may determine that the subnet 32-1 is an authorized subnet (FIG. 2, step 110) and, in response, may take no further action by allowing video content transactions between the subnet 32-1 and the content streaming system 12 (FIG. 2, step 112).

In other examples, the machine-learned model 50 may determine that the subnet 32-1 is a malicious subnet (FIG. 2, step 114) and, in response, may provide blocking instructions 72 to the content streaming system 12 (e.g., to the controller 22) (FIG. 2, step 116). As described herein, the content streaming system 12 may terminate each socket connection 40 between the client devices 34 operating on the subnet 32-1 and the content streaming system 12 based on the blocking instructions 72 (FIG. 2, step 118).

Figure 3:
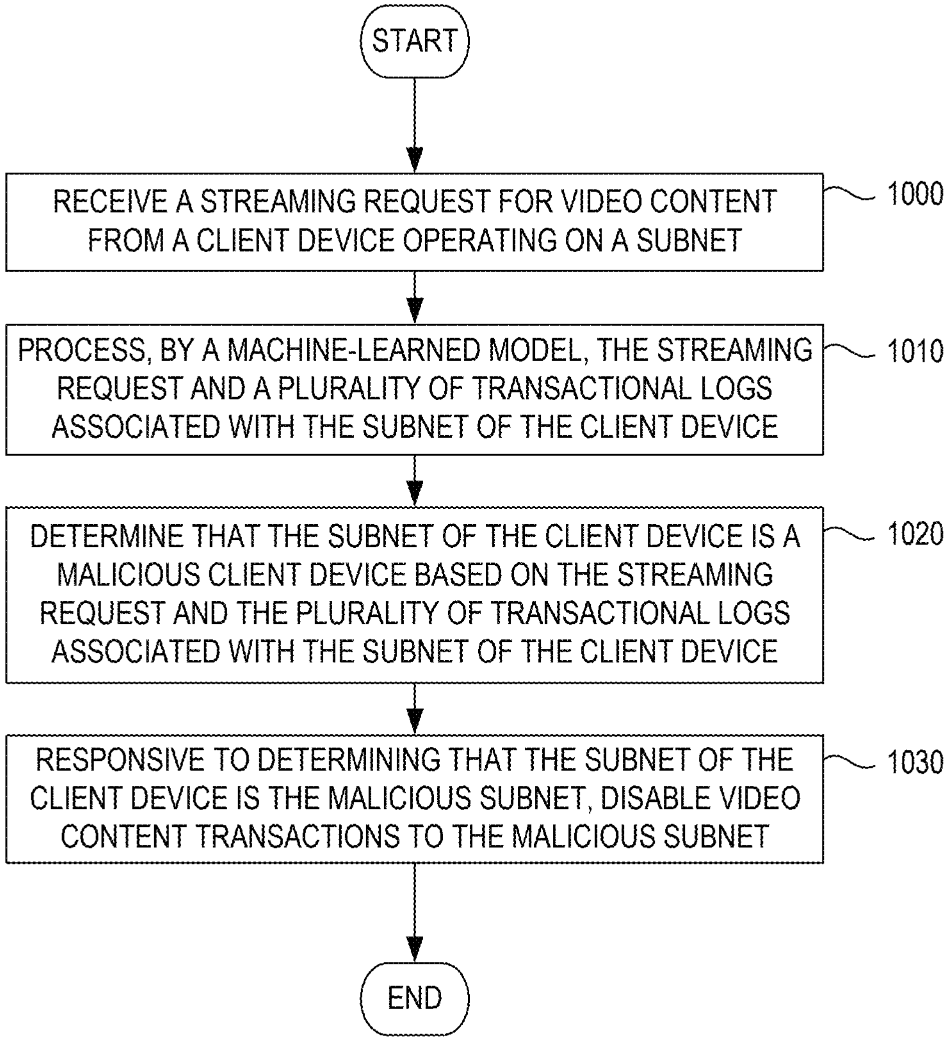
FIG. 3 is a flowchart of an example autonomous content streaming system monitoring and malicious subnet-detection method according to some implementations.

FIG. 3 depicts a flowchart of an example autonomous content streaming system monitoring and malicious subnet-detection method according to some implementations. FIG. 3 will be discussed in conjunction with FIG. 1. The content streaming system 12 receives a streaming request 44 for video content 38 from the client device 34-1 operating on the subnet 32-1 (FIG. 3, block 1000). The content streaming system 12 (e.g., machine-learned model 50) processes the streaming request 44 and a plurality of transactional logs 46 associated with the subnet 32-1 of the client device 34-1 (FIG. 3, block 1010). The content streaming system 12 determines that the subnet 32-1 of the client device 34-1 is a malicious subnet 32-1, which is associated with hosting pirated video content 38', based on the streaming request 44 and the plurality of transactional logs 46 associated with the subnet 32-1 of the client device 34-1 (FIG. 3, block 1020). Responsive to determining that the subnet 32-1 of the client device 34-1 is the malicious subnet 32-1, the content streaming system 12 disables video content transactions to the malicious subnet 32-1 (FIG. 3, block 1030).

Figure 4:
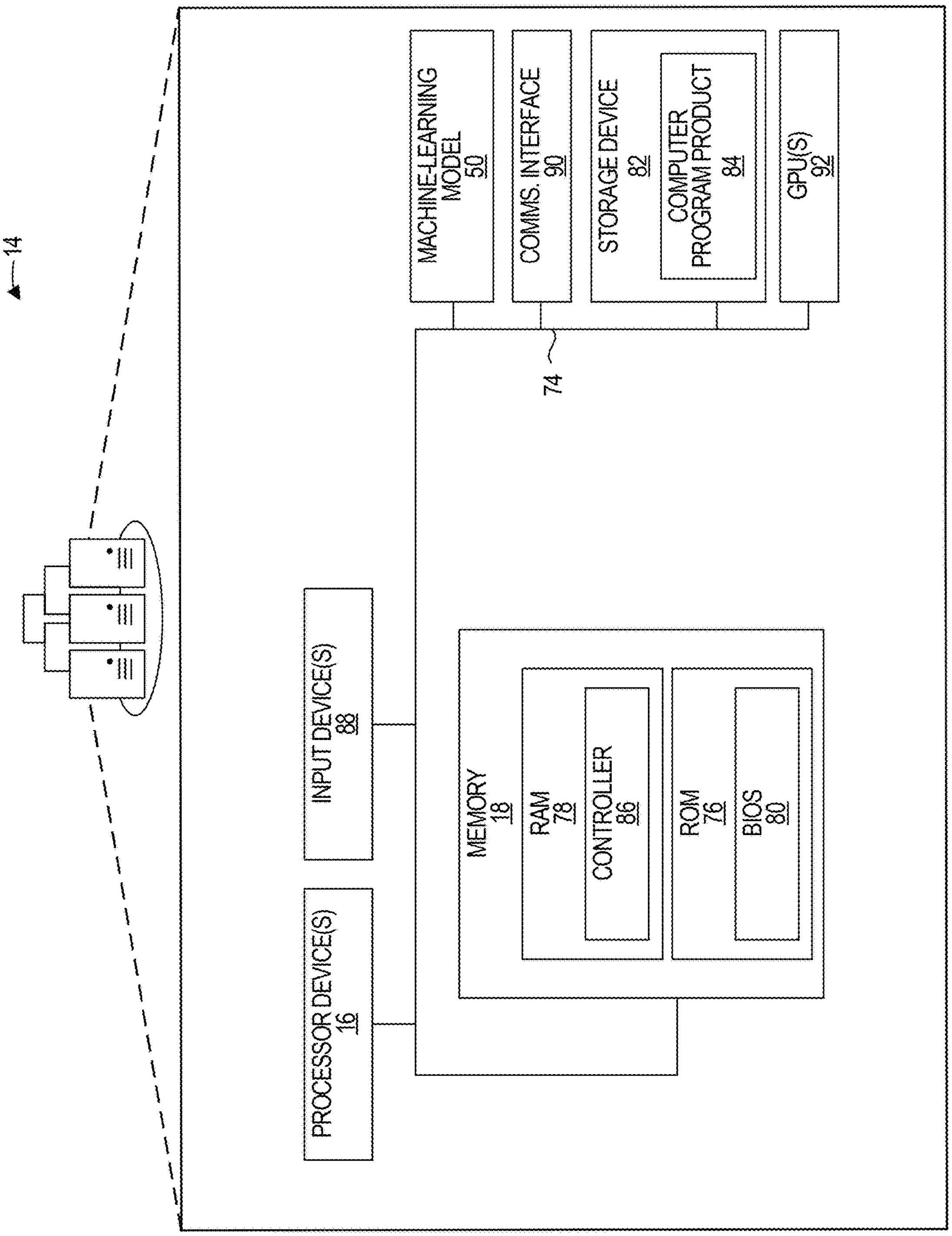
FIG. 4 is a block diagram of a computing device of an example content streaming system suitable for implementing examples disclosed herein.

FIG. 4 depicts a block diagram of an example computing device of the content streaming system 12 (e.g., described above with reference to FIGS. 1-3), such as the computing device 14, suitable for implementing examples disclosed herein according to some implementations. The computing device 14 may be any suitable computing device operable to perform the malicious subnet-detection operations described herein for the content streaming system 12.

The computing device 14 may include any computing and/or electronic device capable of including firmware, hardware, and/or executing software instructions to implement the functionality described herein, such as a computer server, computing device, and/or the like. The computing device 14 includes processor device(s) 16, a system memory (e.g., memory 18), and a system bus 74. The system bus 74 provides an interface for system components including, but not limited to, the memory 18 and the processor device 16. The processor device(s) 16 may be any commercially available or proprietary processor.

The system bus 74 may be any of several types of bus structures that may further interconnect to a memory bus (with or without a memory controller), a peripheral bus, and/or a local bus using any of a variety of commercially available bus architectures. The memory 18 may include non-volatile memory 76 (e.g., read-only memory (ROM), erasable programmable read-only memory (EPROM), electrically erasable programmable read-only memory (EEPROM), etc.), and volatile memory 78 (e.g., random-access memory (RAM)). A basic input/output system (BIOS) 80 may be stored in the non-volatile memory 76 and may include the basic routines that help to transfer information between elements within the computing device 14. The volatile memory 78 may also include a high-speed RAM, such as static RAM, for caching data.

The computing device 14 may further include or be coupled to a non-transitory computer-readable storage medium, such as a storage device 82, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 82 and other drives associated with computer-readable media and computer-usable media may provide non-volatile storage of data, data structures, computer-executable instructions, and the like.

A number of modules can be stored in the storage device 82 and in the volatile memory 78, including an operating system and one or more program modules, which may implement the functionality described herein in whole or in part. All or a portion of the examples may be implemented as a computer program product 84 stored on a transitory or non-transitory computer-usable or computer-readable storage medium, such as the storage device 82, which includes complex programming instructions, such as complex computer-readable program code, to cause the processor device 16 to carry out the steps described herein. Thus, the computer-readable program code may comprise software instructions for implementing the functionality of the examples described herein when executed on the processor device 16. The processor device 16, in conjunction with a controller 86 (e.g., controller 22) in the volatile memory 78, may serve as a controller and/or or a control system for the computing device 14 and/or the content streaming system 12 that is to implement the functionality described herein.

An operator (e.g., user) may also be able to enter one or more configuration commands through one or more input device(s) 88, such as a keyboard (not illustrated), a pointing device such as a mouse (not illustrated), or a touch-sensitive surface such as a display device. Such input devices 88 may be connected to the processor device 16 through an input interface (not shown) coupled to the system bus 74 but can be connected through other interfaces such as a parallel port, an Institute of Electrical and Electronic Engineers (IEEE) 1394 serial port, a Universal Serial Bus (USB) port, an IR interface, and/or the like.

The computing device 14 may also include a number of communication interfaces, such as communication interface 90, that are suitable for communicating with a network (or devices connected thereto) as appropriate or desired. For instance, in some examples, the computing device 14 may be operable to communicate with one or more downstream computing devices (e.g., subnets 32) and/or one or more upstream computing devices (e.g., computing devices operating on other networks) via the communication interface 90. The computing device 14 may further include one or more GPUs 92.

In some examples, the computing device 14 may further include the machine-learning model 50. Although not depicted as such in FIG. 4, the machine-learning model 50 may be stored in the memory 18, the storage device 82, and/or the like. As described above, the machine-learned model 50 may be trained using historical streaming data 54 (not shown) as training data and may be configured to identify streaming-pattern characteristics 52 indicative of malicious subnets based on the historical streaming data 54. Furthermore, the computing device 14 may be receive a streaming request 44 (not shown) from a subnet 32 (not shown) and may be configured to leverage the machine-learned model 50 to determine whether the subnet 32 (not shown) is an authorized subnet and/or a malicious subnet. In some examples, depending on whether the subnet 32 (not shown) is an authorized subnet and/or a malicious subnet, the machine-learned model 50 may be configured to generate and provide instructions (e.g., blocking instructions 72) to other computing devices of the content streaming system 12. The machine-learning model 50 may be any suitable machine-learning model, such as, by way of non-limiting example, a neural network (e.g., deep neural network, feed-forward neural network, recurrent neural network, convolutional neural network, etc.) and/or other types of machine-learning models (e.g., non-linear models, linear models, etc.). In some examples, the machine-learning model 50 may be trained using an unsupervised training algorithm (not shown) (e.g., K-means, hierarchical clustering, etc.) to refine the machine-learning model 50 and its corresponding outputs.

Individuals will recognize improvements and modifications to the preferred examples of the disclosure. All such improvements and modifications are considered within the scope of the concepts disclosed herein and the claims that follow.

What is claimed is:

1. A method, comprising:

receiving, by a content streaming system comprising one or more computing devices, a streaming request for video content from a client device operating on a subnet;

processing, by a machine-learned model of the content streaming system, the streaming request and a plurality of transactional logs associated with the subnet of the client device;

determining, by the content streaming system, that the subnet of the client device is a malicious subnet based on the streaming request and the plurality of transactional logs associated with the subnet of the client device, the malicious subnet being associated with hosting pirated video content; and responsive to determining that the subnet of the client device is the malicious subnet, disabling, by the content streaming system, video content transactions to the malicious subnet.

2. The method of claim 1, wherein determining that the subnet of the client device is the malicious subnet comprises:

determining, by the machine-learned model of the content streaming system, a streaming-request count for the subnet of the client device based on the plurality of transactional logs associated with the subnet, the streaming-request count corresponding to a number of streaming requests received by the content streaming system that originate from the subnet of the client device;

determining, by the machine-learned model of the content streaming system, that the streaming-request count for the subnet of the client device exceeds a streaming-request threshold; and responsive to determining that the streaming-request count exceeds the streaming-request threshold, determining, by the machine-learned model of the content streaming system, that the subnet of the client device is the malicious subnet.

3. The method of claim 2, wherein the streaming-request threshold is based on a number of authorized users associated with the subnet.

4. The method of claim 1, wherein determining that the subnet of the client device is the malicious subnet comprises:

determining, by the machine-learned model of the content streaming system, a streaming-request rate for the subnet of the client device based on the plurality of transactional logs associated with the subnet, the streaming-request rate corresponding to a frequency of streaming requests received by the content streaming system that originate from the subnet of the client device;

determining, by the machine-learned model of the content streaming system, that the streaming-request rate for the subnet of the client device exceeds a request-rate threshold; and responsive to determining that the streaming-request rate exceeds the request-rate threshold, determining, by the machine-learned model of the content streaming system, that the subnet of the client device is the malicious subnet.

5. The method of claim 1, wherein determining that the subnet of the client device is the malicious subnet comprises:

identifying, by the machine-learned model of the content streaming system, a network operator of the subnet of the client device based on the streaming request;

determining, by the machine-learned model of the content streaming system, that the network operator of the subnet is associated with hosting the pirated video content based on historical streaming data; and responsive to determining that the network operator of the subnet is associated with hosting the pirated video content, determining, by the machine-learned model of the content streaming system, that the subnet of the client device is the malicious subnet.

6. The method of claim 5, wherein the content streaming system is associated with a first service provider, and wherein determining that the network operator of the subnet is associated with hosting the pirated video content comprises:

determining, by the machine-learned model of the content streaming system, that the network operator of the subnet is a second service provider based on the historical streaming data, the second service provider being different from the first service provider.

7. The method of claim 6, wherein the second service provider is a cloud service provider.

8. The method of claim 5, wherein determining that the network operator of the subnet is associated with hosting the pirated video content comprises:

obtaining, by the machine-learned model of the content streaming system, an autonomous system number (ASN) associated with the network operator of the subnet; and determining, by the machine-learned model of the content streaming system, that the ASN associated with the network operator of the subnet is associated with hosting the pirated video content based on the historical streaming data, the historical streaming data comprising a plurality of ASNs respectively associated with a plurality of malicious network operators.

9. The method of claim 1, wherein disabling the video content transactions to the malicious subnet comprises:

responsive to determining that the subnet of the client device is the malicious subnet, configuring, by the machine-learned model of the content streaming system, a network controller of the content streaming system to block layer 3 communications between the malicious subnet and the content streaming system.

10. The method of claim 9, wherein configuring the network controller of the content streaming system to block the layer 3 communications between the malicious subnet and the content streaming system comprises:

responsive to determining that the subnet of the client device is the malicious subnet, automatically providing, by the machine-learned model of the content streaming system, a blocking instruction to the network controller; and disabling, by the network controller of the content streaming system, the layer 3 communications between the malicious subnet and the content streaming system based on the blocking instruction.

11. The method of claim 1, wherein disabling the video content transactions to the malicious subnet comprises:

responsive to determining that the subnet of the client device is the malicious subnet, terminating, by the content streaming system, a socket connection between the client device and the content streaming system.

12. The method of claim 11, wherein the client device is one of a plurality of malicious client devices operating on the malicious subnet, and wherein disabling the video content transactions to the malicious subnet further comprises:

responsive to determining that the subnet of the client device is the malicious subnet, terminating, by the content streaming system, each respective socket connection between the plurality of malicious client devices and the content streaming system.

13. The method of claim 1, wherein determining that the subnet of the client device is the malicious subnet comprises:

receiving, by the content streaming system from the client device, a Hypertext Transfer Protocol (HTTP) POST request; and responsive to receiving the HTTP POST request from the client device, determining, by the machine-learned model of the content streaming system, that the subnet of the client device is the malicious subnet.

14. The method of claim 1, further comprising:

storing, by the content streaming system, data identifying the malicious subnet in a storage device of the content streaming system; and providing, by the content streaming system to the machine-learned model, a plurality of transactional logs associated with the malicious subnet and the data identifying the malicious subnet as training data.

15. The method of claim 1, further comprising:

determining, by the content streaming system, that the subnet of the client device is an authorized subnet based on the streaming request and the plurality of transactional logs associated with the subnet of the client device, the authorized subnet being authorized to host the video content; and responsive to determining that the subnet of the client device is the authorized subnet, providing, by the content streaming system, the video content to the client device.

16. A content streaming system, comprising:

a machine-learned model; and one or more computing devices operable to:

receive a streaming request for video content from a client device operating on a subnet;

process, by the machine-learned model, the streaming request and a plurality of transactional logs associated with the subnet of the client device;

determine that the subnet of the client device is a malicious subnet based on the streaming request and the plurality of transactional logs associated with the subnet of the client device, the malicious subnet being associated with hosting pirated video content; and responsive to determining that the subnet of the client device is the malicious subnet, disable video content transactions to the malicious subnet.

17. The content streaming system of claim 16, wherein the content streaming system is a content delivery network (CDN).

18. The content streaming system of claim 16, wherein the machine-learned model is configured to identify streaming-pattern characteristics indicative of malicious subnets based on historical streaming data.

19. The content streaming system of claim 18, wherein the historical streaming data comprises:

historical streaming requests from:

authorized client devices; and malicious client devices; and historical transactional logs associated with:

authorized subnets; and malicious subnets.

20. A non-transitory computer-readable storage medium that includes executable instructions configured to cause a processor device of a content streaming system comprising a machine-learned model to:

receive a streaming request for video content from a client device operating on a subnet;

process, by the machine-learned model, the streaming request and a plurality of transactional logs associated with the subnet of the client device;

determine that the subnet of the client device is a malicious subnet based on the streaming request and the plurality of transactional logs associated with the subnet of the client device, the malicious subnet being associated with hosting pirated video content; and responsive to determining that the subnet of the client device is the malicious subnet, disable video content transactions to the malicious subnet.

* * * * *